United States Patent [19]
Kaida

[11] Patent Number: 4,857,941

[45] Date of Patent: Aug. 15, 1989

[54] MULTICOLOR THERMAL RECORDING DEVICE

[75] Inventor: Shinichi Kaida, Kanagawa, Japan

[73] Assignee: Fuji Photo Film Co., Ltd., Kanagawa, Japan

[21] Appl. No.: 182,684

[22] Filed: Apr. 18, 1988

[30] Foreign Application Priority Data

Apr. 16, 1987 [JP] Japan .................................. 62-94214

[51] Int. Cl.$^4$ ........................ G01D 15/10; B41J 33/00; B22B 9/06

[52] U.S. Cl. ................................ 346/76 PH; 346/46; 400/120; 400/240; 400/216.1; 428/322.2; 428/480; 428/484; 428/488.1; 428/488.4

[58] Field of Search ............ 346/76 PH, 46; 400/120, 400/240, 216.1; 428/322.2, 480, 484, 488.1, 488.4

[56] References Cited

U.S. PATENT DOCUMENTS 3,813,677 5/1974 Shimotsuma .................. 346/76 PH
4,551,729 11/1985 Kubo et al. .......................... 346/1.1

*Primary Examiner*—E. A. Goldberg
*Assistant Examiner*—Gerald E. Preston
*Attorney, Agent, or Firm*—Sughrue, Mion, Zinn, Macpeak & Seas

[57] ABSTRACT

A recording device for thermal color recording of a medium having two color coupler layers on one side and another color coupler layer on the other side of a transparent support. The layer on the side with two layers and having the higher heat sensitivity is first thermally imaged and then optically fixed. Thereafter, the remaining layer on that side and the layer on the other side are thermally imaged.

4 Claims, 4 Drawing Sheets

MULTICOLOR THERMAL RECORDING DEVICE

DESCRIPTION

1. Field of the Invention

This invention relates to a thermal recording device employing a heat-sensitive recording medium which can produce a plurality of colors. More particularly, it is a multicolor thermal recording device which records a plurality of substantially mutually independent images having different hues under the action of heat by employing a recording medium which comprises a transparent support having at least one heat-sensitive coupler layer on each of its two sides.

2. Background Art

The use of thermal recording has recently made rapid progress in the fields of black and white facsimile and printing owing to its numerous advantages including the following:

(1) It requires no development processing;
(2) If it employs a recording medium which comprises a paper support, it can be made of any paper that can be almost of the same quality as ordinary paper;
(3) Its operation is easy to carry out;
(4) It can produce color of high density;
(5) It requires only a recording device which is simple in construction and inexpensive; and
(6) It does not make any noise during its recording operation.

The heat-sensitive recording medium usually comprises a support of, for example, paper or synthetic paper coated with a coupler and a dye. According to a process which is widely employed, it is heated by a thermal head for recording an image in accordance with an electrical signal corresponding to an original copy.

There has recently arisen a great demand for recording media which can be used for a variety of new applications. More particularly, the rapid growth of the information industry has given rise to a strong desire to obtain easily a hard colored copy from the output device of a computer, facsimile device, or other information handling apparatus. In this connection, a study has been made of the possibility of employing an ink jet process or a thermal transfer process. The ink jet process, however, has poor recording reliability. It employs a fine nozzle for producing a jet of an ink containing a dye, and the nozzle is easily blocked with the dye or other material that the ink contains. The thermal transfer process also has a serious drawback. It is basically a process which heats an inked sheet carrying an image defined by an ink and transfers the molten ink onto paper to reproduce the image thereon. It is, therefore, an uneconomical process which requires a plurality of inked sheets, for example, four inked sheets for reproducing a four-colored image. The user of the ink jet process is required to make sure that there be always a sufficient supply of the ink solution, while the user of the thermal transfer process is required to make sure that there always is a sufficient supply of inked sheets. In either event, the process calls for a great deal of care which imposes a great burden on the user.

There is also known a thermal color producing process. This is known as a process which does not require any such care, but yet has a high level of recording reliability. If a multicolor recording medium which is suitable for use in this process is realized, there is no doubt that it would provide a very effective multicolor recording operation which is easy to carry out without involving any of the problems which have hereinabove been pointed out. In order to obtain a satisfactory multicolor recording medium. however, it is necessary to incorporate in a single support a plurality of coupling mechanisms corresponding to a plurality of respective desired colors in such a way that each mechanism may function under appropriate control.

A great deal of effort has so far been expended in realizing a recording medium or technique which can satisfy such requirements. None of them has, however, been satisfactory with respect to the number of colors, which can be produced, or the separation of one color from another. According to one of the known processes, a plurality of coloring units are gradually added to other coloring units with an increase in the amount of heat energy which is applied, so that they may mix to form different colors, while each color reduces its clarity, as described in, for example, Japanese Patent Publication Nos. 19989/1976 or 11231/1977, or Laid-Open Patent Specification Nos. 88135/1979, 133991/1980 or 13992/1980. Another known process employs a color erasing mechanism and is disclosed in, for example, Japanese Patent Publication Nos. 17868/1975, 5791/1976, 14318/1982 or 14319/1982, or Laid-Open Patent Specification No. 161688/1980. When a color erasing unit which is sensitive to a relatively high temperature produces a color a coupler acts to erase the color produced by a coloring unit which is sensitive to a relatively low temperature.

Neither of these processes can, however, be considered to be useful for preparing a hard colored copy of fully acceptable quality as they can produce only a limited number of colors, or only those colors which lack clarity due to running or mixing. The limited number of colors which can be produced is particularly a fatal defect for a hard colored copy. There are apparently a number of major reasons why this defect is difficult to overcome, including one which will now be discussed. One who desires to obtain a copy having a greater number of colors may simply think of the possibility of dividing the maximum amount of heat energy into a greater number of gradations which are differentiated by a greater difference from one another, and thereby preparing a thermal recording medium having on a single support a plurality of heat-sensitive coupler layers which are responsive to those different respective amounts of heat energy. As a matter of practice, however, the use of a lower or higher range of heat energy than what has hitherto been employed necessarily gives rise to a number of serious new problems. A recording medium to which a lower range of heat energy is applicable tends to present so low a degree of unexposed storage stability that it may easily fog. A higher range of heat energy is likely to burn or melt the recording medium and cause it to stick to a thermal head. Its sticking naturally prevents the medium from travelling smoothly and also shortens the life of the thermal head. If these aspects and also the clear separation of colors are taken into account, therefore, it is practically impossible to divide the amount of applicable heat energy into more than two units.

There is known a heat-sensitive recording medium comprising an opaque support made of, for example, ordinary paper or synthetic paper. A colored image which is formed on this type of medium is read as an image reflected from one side of the support. There is also known a heat-sensitive recording medium which comprises a substantially transparent support, as described in, for example, Japanese Laid-Open Patent Application Nos. 227086/1986 or 44492/1987. This type of medium is intended for producing a thermally recorded image of high quality which presents an excellent degree of luster when viewed through its transparent support. There is also known a medium having heat-sensitive coupler layers on both sides of an opaque support, as proposed, for example, in Japanese Laid-Open Patent Specification Nos. 208298/1982. This type of medium is intended for making both sides of the support available for printing or recording and thereby achieving a lower cost of printing or reproduction and a more economical use of the space required for the storage of printed or reproduced matter. In neither case, however, are the properties of the support utilized positively for realizing a multicolor recording medium.

SUMMARY OF THE INVENTION

It is, therefore, an object of this invention to provide a device which can record a multicolored image by employing a heat-sensitive recording medium which can be fully controlled with respect to the number of colors which it produces, and the separation thereof.

This object is attained by a device which comprises means for conveying a heat-sensitive recording medium comprising a transparent support having at least one coupler layer on each of both sides thereof, recording means for supplying heat energy to the coupler layer to cause it to produce a color and means for fixing the coupler layer. The recording medium preferably has an undercoating layer on each side of the support. It has one or two heat-sensitive layers on each side thereof, or in other words, it has a plurality of heat-sensitive layers which can produce a total of at least two colors.

DETAILED DESCRIPTION OF THE PREFFERRED EMBODIMENTS

Figure 1A:
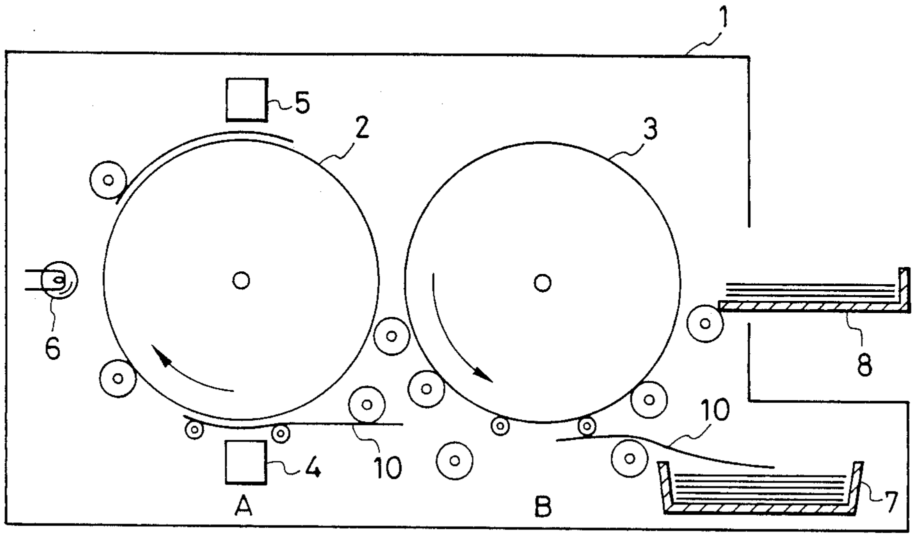
FIGS. 1(A) and 1(B) are schematic representations of a device embodying this invention.
Figure 1B:
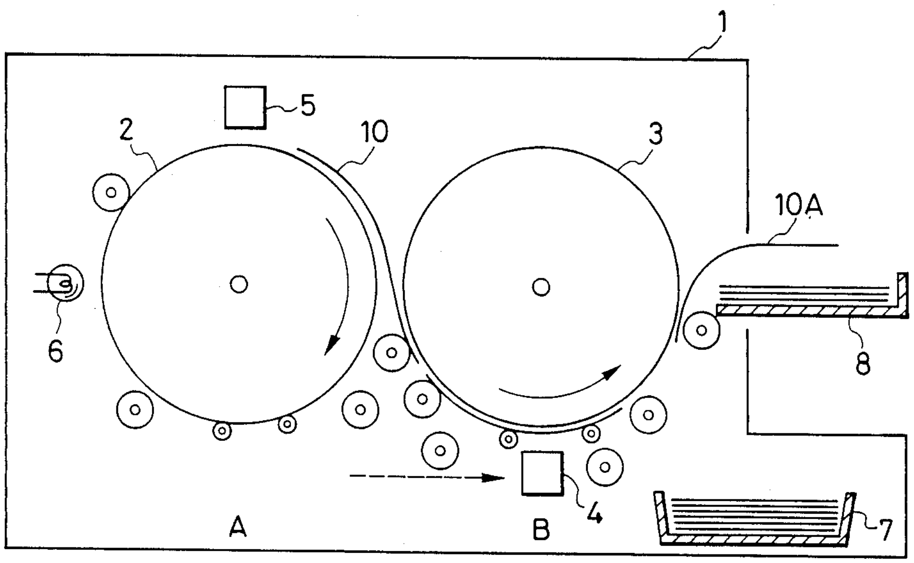

A device embodying this invention is shown in FIGS. 1(A) and 1(B). A pair of recording drums 2 and are provided in a light-shielded enclosure 1, which are rotatable in the directions of the respective arrows. A linear matrix thermal head 4 is provided below the drums 2 and 3 and can move between A and B positions below the respective drums 2 and 3. A stationary linear thermal head 5 is provided above the drum 2. It is operable for recording at a temperature which is higher than that at which the lower thermal head 4 is operable. A light source 6 is provided beside the drum 2 for the optical fixing of a light-sensitive recording medium 10, here illustrated in the form of a sheet. The recording medium 10 which is used for the thermal recording of a multicolored image is supplied from a cassette 7, and the recording medium 10A carrying a multicolored image is collected in a tray 8.

Figure 2A:
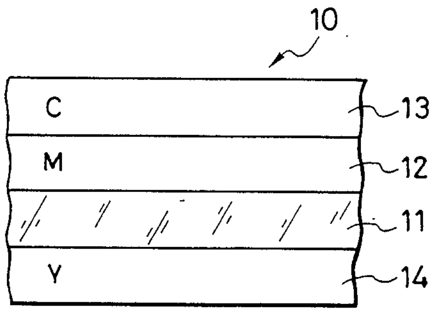
FIG. 2(a) is a sectional view showing by way of example a heat-sensitive recording medium which can be employed in the device of this invention.
Figure 3:
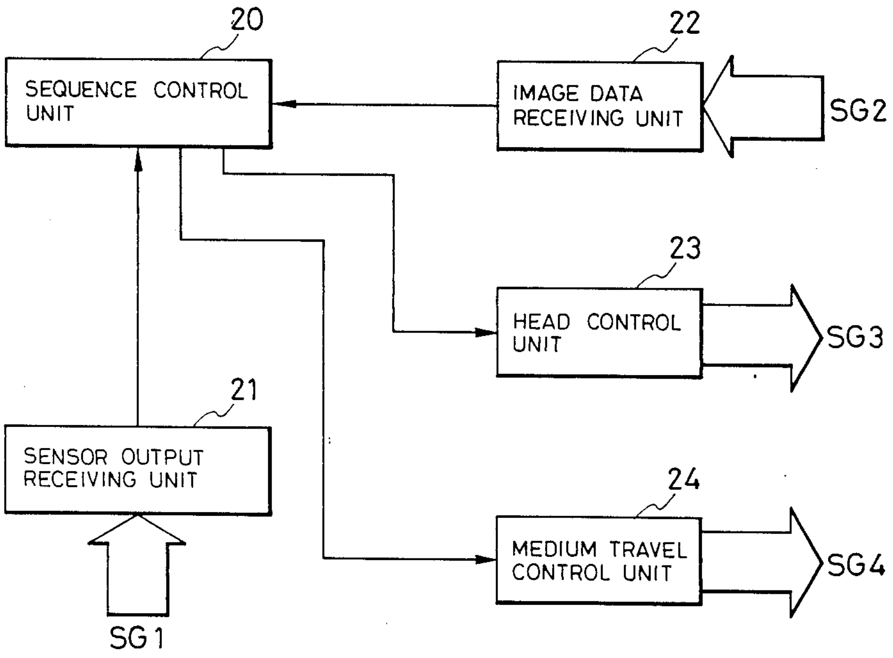
FIG. 3 is a block diagram of a control system for the device of this invention.

The light-sensitive recording medium 10 may, for example as shown in FIG. 2(A), comprise a transparent support 11 having an M layer 12 for producing an M (magenta) color and a C layer 13 for producing a C (cyan) color on its front side and a Y layer 14 for producing a Y (yellow) color in its back side though it will be described later in further detail. FIG. 3 shows a control system for the recording device of FIGS. 1(A) and 1(B). It includes a sequence control unit 20 which may, for example, comprise a microprocessor and which is adapted for receiving the outputs of various sensors, including a sensor for the position of the light-sensitive recording medium 10 and a light leakage sensor (not illustrated) through a sensor output receiving unit 21. An NTSC signal from a TV receiver, an analog or digital RGB signal from, for example, a personal computer and an image signal SC2 from, for example, a public circuit are inputted to the unit 20 through an image data receiving unit 22. A head control unit 23 is provided for outputting a signal SG3, such as an image recording signal, a head pressure control signal or a head position control signal. The signal SG3 is output from the sequence control unit 20 to the thermal heads 4 and 5. The image recording signal is multiplexed to the separate pins of the linear matrix heads 4 and 5. A medium travel control unit 24 is provided for controlling the travel of the light-sensitive recording medium 10 and for controlling interruption of the travel.

Figure 4:
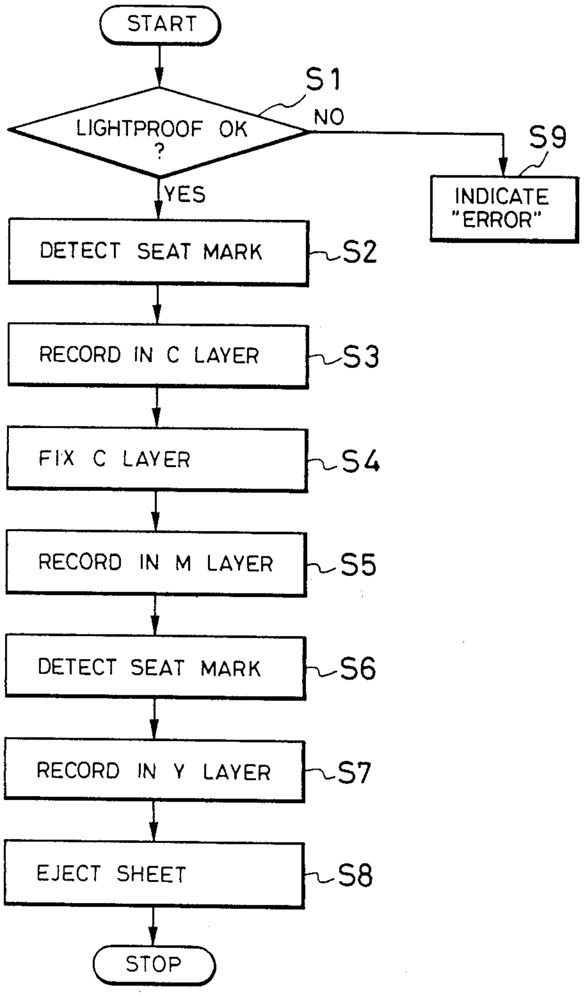
FIG. 4 is a flow chart showing by way of example a sequence of operation which is followed by the device of this invention.

FIG. 4 is a flow chart showing the sequence of operations of the device as hereinabove described. When a recording operation cycle is started, the thermal head 4 stays at its A position, as shown in FIG. 1(A). The lightproofness of the enclosure 1 is checked by the light leakage sensor in the enclosure 1 (Step S1), and if its lightproofness is not satisfactory, an error signal is displayed (Step S9). If its lightproofness is satisfactory, a recording medium conveying mechanism is driven by the medium travel control unit 24 and the drums 2 and 3 are rotated in the directions of the arrows for drawing a sheet of heat-sensitive recording medium 10 out of the cassette 7 and conveying it until a seat mark on the recording medium 10 is detected by the medium position sensor. Thereupon, the recording medium 10 is stopped in front of the thermal head 4 (Step S2). The thermal head 4 is operated by the head control unit 23 to record an image line by line in the C layer 13 (Step S3). As the C layer 13 is located on the outside of the recording medium 10, the thermal head 4 is required to supply only a relatively small amount of energy as compared with the amount of energy which is supplied by the thermal head 5. When each line of the image has been recorded in the C layer by the thermal head 4, the recording medium 10 is caused by the medium travel control unit 24 to travel forward by a distance corresponding to each such line. Eventually, it reaches the light source 6 and the C layer 13 is thereby fixed (Step S4). The recording medium 10 in which the C layer 13 has been fixed is conveyed to the thermal head 5 and the thermal head 5 is operated by the head control unit 23 to record an image in the M layer 12 (Step S5). As the M layer 12 is located inwardly of the C layer 13, a larger amount of heat energy is supplied for recording the image in the M layer 12. The thermal head 5 records no further image in the C layer 13 which has already been fixed by the light source 6. Then, the recording medium 10 is further conveyed and when it is transferred from the first drum 2 to the second drum 3 as shown in FIG. 1(B), it is reversed in orientation, while the thermal head 4 is moved from its A position to its B position beneath the second drum 3. As soon as the seat mark on the recording medium 10 is detected by a sensor associated with the second drum 3 (Step S6), the recording medium 10 is stopped and the thermal head 4 is operated to record an image line by line in the Y layer (Step S7).

Figure 2B:
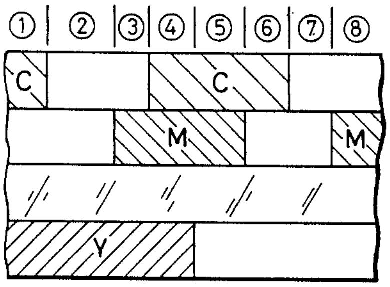
FIG. 2(B) is a sectional view showing various colors as produced in the medium of FIG. 2(A).

The recording medium 10A having the images successively recorded in its C, M and Y layers as hereinabove described is collected into the tray 8 (Step S8). FIG. 2(B) shows by way of example a pattern in which a plurality of colors have been produced. Each area marked by oblique lines is an area in which the C, M or Y layer has produced its respective color as a result of sensitization by the thermal head 4 or 5. In FIG. 2(B), portion (1) presents a green (G) color obtained by the combining of C and Y, and portion (2) has a yellow (Y) color. Portion (3) presents a red (R) color obtained by the combining of M and Y, portion (4) presents a black (BK) color as a result of the combining of C, M and Y, and portion (5) presents a blue (B) color obtained by the combining of C and M. Portion (6) has a cyan (C) color, portion (7) has a white color, and portion (8) has a magenta (M) color. The combination of portions (1) to (8) provides a multicolored image.

The light-sensitive recording medium which can be used in the device of this invention will now be described in further detail by way of example.

The recording medium comprises a transparent support having a heat-sensitive layer for producing a cyan color on one side thereof and a heat-sensitive layer for producing a magenta color on the other side thereof. The two layers are sensitizable by an equal amount of heat energy. If an image is thermally recorded on both sides of the support by a thermal pen or head, it is possible to produce the cyan and magenta colors independently of each other by applying substantially the same amount of heat energy to both of the layers. As the support is substantially transparent, it is possible to achieve the effective separation of colors, i.e., cyan, magenta and cyan+magenta (blue), when viewed from one side of the medium.

Although the foregoing description has referred to the case in which two coloring units, i.e., cyan and magenta, are used, the basic principle is equally applicable to the case in which three coloring units, i.e., cyan, magenta and yellow, are employed. It is, for example, possible to provide a heat-sensitive layer for producing a yellow color on one side of a transparent support aid to provide on the other side thereof both a heat-sensitive layer for producing a magenta color and on top of the magenta layer a heat-sensitive layer for producing a cyan color. In order to ensure that a third color be produced independently of the other colors, it is advisable to employ the coupling and optical fixing reactions of diazo compounds as disclosed in Laid-Open Patent Specification No. 40192/1986, etc. More specifically, a relatively small amount of heat energy is first applied to the yellow and cyan layers on the outer surfaces of the support so that they may produce their colors independently of each other. The layers are fixed by light of a specific wavelength which selectively decomposes the diazo compounds in those layers. Then, a relatively large amount of heat energy is applied to the magenta layer which is located inwardly of the surfaces of the medium and is, therefore, less sensitive to heat. Thereby, the cyan, magenta and yellow colors can be produced independently of one another on both sides of the support. The process which has hereinabove been described is of great practical values, as the amount of heat energy which is employed for producing the color in the magenta layer is not so large as to impose a very large load on the recording medium or device. It enables the effective separation of seven basic colors, i.e., cyan, magenta, yellow, cyan+magenta (blue), magenta+yellow (red), cyan+yellow (green) and cyan+magenta+yellow (black), when viewed from one side of the support, while it has hitherto been considered difficult to achieve such a large number of colors by any conventional thermal recording technique.

The yellow color is effectively separable even without fixing, as it is produced on the opposite side of the support from the other colors. It is, of course, possible to produce a greatly increased number of mixed colors if the amount of heat energy which is applied to each layer is appropriately adjusted to control the color which it produces.

While a typical process for producing a plurality of colors has been briefly described, the heat-sensitive layers may be formed from any material without limitation in particular, if it contains substances which produce a color as a result of their contact under heat. It is usually possible to use without any particular limitation any material that contains an acidic substance. A typical material is a combination of an acidic substance and a basic dye precursor, or a combination of diazo and coupling compounds. The basic dye precursor in the former combination is a substance which produces a color by donating electrons, or accepting protons from an acid, etc. Although it is possible to use any such substance without any particular limitation, it is usual to employ a substantially colorless compound containing a partial skeleton of lactone, lactum, sultone, spiropyran, ester, amide, etc. which undergoes splitting or cleavage upon contacting a coupler. More specifically, it is possible to use, for example, Crystal Violet Lactone, Benzoyl Leucomethylene Blue, Malachite Green Lactone, Rhodamine B Lactum, or 1,3,3-trimethyl-6′-ethyl-8′-butoxyindolinobenzospiropyran.

As a coupler for these dyes, it is possible to use an acidic substance, such as phenol compound, an organic acid or a metal salt thereof, or a hydroxybenzoic ester. It is particularly preferable to use a phenol compound or organic acid which is sparingly soluble in water and has a melting point of 50° C. to 250° C., or preferably of 60° C. to 200° C. Specific examples of the phenol compounds which can be used include 4,4′-isopropylidenediphenol (bisphenol A), p-tert-butylphenol, 2,4-dinitrophenol, 3,4-dichlorophenol, 4,4′-methylene-bis(2,6-ditertbutylphenol), p-phenylphenol, 4,4-cyclohexylidenediphenol, 2,2′-methylene-bis(4-tert-butylphenol), 2,2′-methylenebis(α-phenyl-p-cresol)-thiodiphenol, 4,4′-thiobis(6-tert-butyl-m-cresol), sulfonyldiphenol, 1,1-bis(4-hydroxyphenyl)-n-dodecane and ethyl 4,4-bis(4-hydroxyphenyl)-1-pentanoate, as well as p-tert-butylphenol-formalin and p-phenylphenol-formalin condensates. Examples of the useful organic acids and metal salts thereof are 3-tert-butylsalicylic acid, 3,5-tert-butylsalicylic acid, 5-α-methylbenzylsalicylic acid, 3,5-di-α-methylbenzylsalicylic acid, 3-tert-octylsalicylic acid and 5-α,γ-dimethyl-α-phenyl-γ-phenylpropylsalicylic acid, and the zinc, lead, aluminum, magnesium and nickel salts thereof. Examples of the useful hydroxybenzoic esters are ethyl p-hydroxybenzoate, butyl p-hydroxybenzoate, heptyl p-hydroxybenzoate and benzyl p-hydroxybenzoate.

A diazo compound is another typical example of the materials which can be used to form a heat-sensitive layer. It is a compound which can produce a desired color by reacting with a coupling component, but which loses its color producing power if it is decomposed by exposure to light of a specific wavelength before reacting with a coupling component. The color which it can produce depends mainly upon the diazo dye which results from its reaction with the coupling component. As is well known, therefore, it is possible to obtain a different color easily by employing a diazo compound having a different chemical structure, or a coupling component having a different chemical structure, and it is possible to obtain any color substantially as desired if an appropriate combination is employed. Accordingly, it is possible to distribute various kinds of diazo compounds, a single kind of coupling component and other additives in a single layer. This combination provides a plurality of groups of coloring units each consisting of at lease one diazo compound and the common coupling component and additives. Another combination can be obtained by employing various kinds of coupling components in a plurality of layers, respectively, while a diazo compound and other additives are common to all of the layers. In this case, each group of coloring units consists of at least one kind of coupling component and the common diazo compound and additives. In either event, each group of coloring units consists of a combination of at least one kind of diazo compound, and at least one kind of coupling component and other additives which are so combined as to produce a different color.

When a diazo compound which is photolytic, or decomposable by exposure to light is herein spoken of, it mainly refers to an aromatic diazo compound. More specifically, it refers to a compound such as an aromatic diazonium salt, diazosulfonate, or diazoamino compound. The following description will, however, center mainly on a diazonium salt as a typical example. It is generally believed that the photolysis of a diazonium salt takes place at the wavelength at which its absorption maximum occurs. It is also known that a diazonium salt has its absorption maximum at a wavelength of about 200 to about 700 nm which depends on its chemical structure (Takahiro Tsunoda and Atsuo Yamaoka: "Photolysis of Photosensitive Diazonium Salts and their Chemical Structure", Journal of the Japanese Society of Photography, 29(4), pages 197 to 205 (1965)). Therefore, if a diazonium salt is used as a photolytic compound, it is decomposed by light of a specific wavelength depending on its chemical structure, and diazonium salts having different chemical structures produce dyes of different colors by reacting with the same coupling component.

The diazonium salts are the compounds of the general formula $ArN_2^+X^-$, where Ar is a substituted or unsubstituted aromatic group, $N_2^{30}$ is a diazonium group. and $X^-$ is an acid anion.

According to a preferred mode, it is effective to use diazonium compounds having different photolytic wavelengths. Examples of the compounds having a photolytic wavelength in the neighborhood of 400 nm are 4-diazo-1-dimethylaminobenzene, 4-diazo-1-diethylaminobenzene, 4-diazo-1-dipropylaminobenzene, 4-diazo-1-methylbenzylaminobenzene, 4-diazo-1-dibenzylaminobenzene, 4-diazo-1-ethylhydroxyethylaminobenzene, 4-diazo-1-diethylamino-3-methoxybenzene, 4-diazo-1-dimethylamino-2-methylbenzene, 4-diazo-1-benzoylamino-2,5-diethoxybenzene, 4-diazo-1-morpholinobenzene, 4-diazo-1-morpholino-2,5-diethoxybenzene, 4-diazo-1-morpholino-2,5-dibutoxybenzene, 4-diazo-1-anilinobenzene, 4-diazo-1-toluylmercapto-2,5-diethoxybenzene and 4-diazo-1,4-methoxybenzoylamino-2,5-diethoxybenzene. Examples of the compounds having a photolytic wavelength of 300 to 370 nm are 1-diazo-4-(N,N-dioctylcarbamoyl)benzene, 1-diazo-2-octadecyloxybenzene, 1-diazo-4-(4-tert-octylphenoxy)benzene, 1-diazo-4-(2,4-di-tertamylphenoxy)-benzene, 1-diazo-2-(4-tert-octylphenoxy)benzene, 1-diazo-5-chloro-2-(4-tert-octylphenoxy)benzene, 1-diazo-2,5-bis-octadecyloxybenzene, 1-diazo-2,4-bis-octadecyloxybenzene and 1-diazo-4-(N-octylteuloylamino)benzene. The aromatic diazonium compounds, of which typical examples have been given above, can be modified to have widely different photolytic wavelengths if the substituents which they contain are appropriately altered.

Examples of the acid anions are $C_nF_{2n+1}COO^-$ (n is from 3 t 9), $C_mF_{2m+1}SO_3^-$ (m is from 2 to 8), $(C_lF_{2l+1}SO_2)_2CH^-$ (l is from 1 to 18),

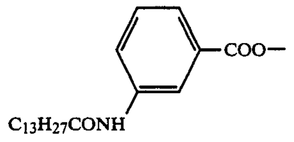

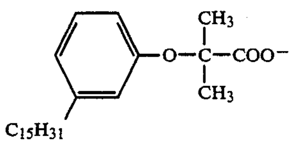

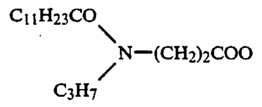

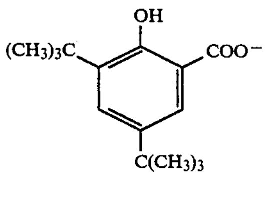

-continued

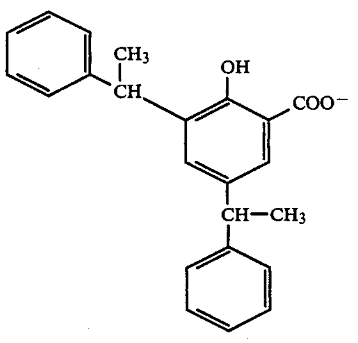

$BF_4^-$ and $PF_6^-$.

Some examples of the diazo compounds (diazonium salts) are represented by the following formulas:

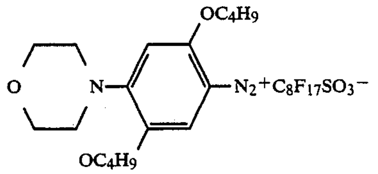

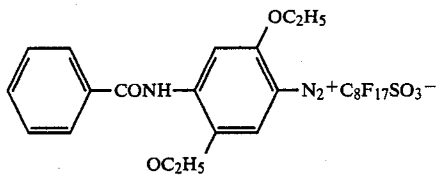

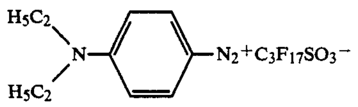

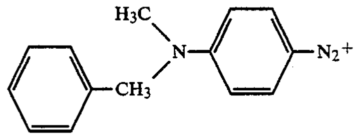

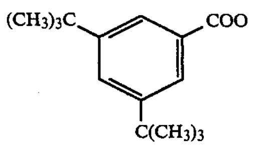

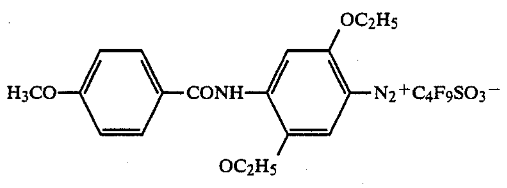

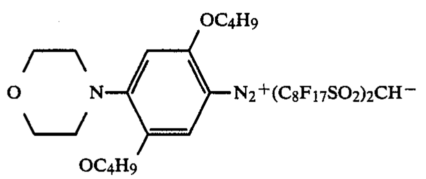

-continued

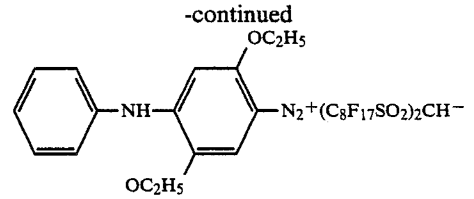

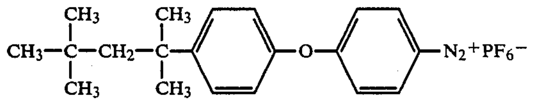

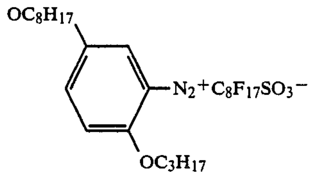

The diazosulfonate compounds which can be employed are of the general formula:

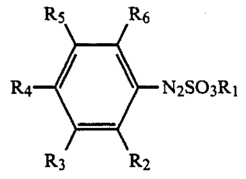

where $R_1$ is an alkali metal or ammonium compound, $R_2$, $R_3$, $R_5$ and $R_6$ are each a hydrogen or halogen atom, or an alkyl or alkoxyl group, and $R_4$ is a hydrogen or halogen atom, or an alkyl, amino, benzoylamide, morpholino, trimercapto or pyrrolidino group. There are known a great many kinds of diazosulfonates. Each of them can be obtained if an appropriate diazonium salt is treated with sulfite. The preferred compounds are benzenediazosulfonates containing substituents such as 2-methoxy, 2-phenoxy, 2-methoxy, 4-phenoxy, 2,4-dimethoxy, 2-methyl-4-methoxy, 2,4-dimethyl, 2,4,6-trimethyl, 4-phenyl, 4-phenoxy and 4-acetamide, or such as 4-(N-ethyl, N-benzylamino), 4-(N,N-dimethylamino), 4-(N,N-diethylamino), 4-(N,N-diethylamino)-3-chloro, 4-pyrrolidino-3-chloro, 4-morpholino-2-methoxy, 4-(4-methoxybenzoylamino)-2,5-dibutoxy and 4-(4'-trimercapto)-2,5-dimethoxy. If any of these diazosulfonates is employed, it is preferably irradiated with light for activation prior to printing.

The diazo compounds which can be employed include diazoamino compounds. They are compounds having diazo groups coupled with dicyandiamide, sarcosine, methyltaurine, N-ethylanthranilic acid-5-sulfonic acid, monoethanolamide, diethanolamine, guanidine, etc.

The coupling components which can be used for the diazo compounds include those which react with a diazo compound (diazonium salt) to form a dye in a basic atmosphere. Specific examples are resorcin, phloroglucin, sodium 2,3-dihydroxynaphthalene-6-sulfonate, 1-hydroxy-2-naphthoic acid morpholinopropylamide, 1,5-dihydroxynaphthalene, 2,3-dihydroxynaphthalene, 2,3-dihydroxy-6-sulfanilnaphthalene, 2-hydroxy-3-naphthoic acid morpholinopropylamide, 2-hydroxy-3-naphthoic acid anilide 2-hydroxy-3-naphthoic acid-2'- methylanilide, 2-hydroxy-3-naphthoic acid octylamide, 2-hydroxy-3-naphthoic acid ethanolamide, 2-hydroxy-3-naphthoic acid octylamide, 2-hydroxy-3-naphthoic acid-N-dodecylhydroxypropylamide, 2-hydroxy-3-naphthoic acid tetradecylamide, acetanilide, acetoacetanilide, benzoylacetanilide, 1-phenyl-3-methyl-5-pyrazolone, 1-(2',4',6'-trichlorophenyl)-3-benzamide-5-pyrazolone, 1-(2',4',6'-trichlorophenyl)-3-anilino-5-pyrazolone, 1-phenyl-3-phenylacetamide-5-pyrazolone, 1-hydroxy-3-naphthoic acid morpholinopropylamide and 2-hydroxy-3-naphthoic acid morpholinopropylamide. The combination of two or more coupling components makes it possible to produce an image having a desired color tone. It is effective to add a basic substance to a layer containing a diazo compound and a coupling component, as the coupling reaction takes place readily in a basic atmosphere.

For this purpose, it is possible to use a basic substance which is sparingly or not at all soluble in water, or a substance which produces an alkali when heated. Examples of these substances are inorganic or organic ammonium salts, organic amines, amides, urea or thiourea or the derivatives thereof, thiazoles, pyrroles, pyrimidines, piperazines, guanidines, indoles, imidazoles, imidazolines, triazoles, morpholines, piperidines, amindines, formazines, pyridines, and other compounds containing nitrogen. More specific examples are ammonium acetate, tricyclohexylamine, tribenzylamine, octadecylbenzylamine, stearylamine, allylurea, thiourea, methylthiourea, allylthiourea, ethylenethiourea, 2-benzylimidazole, 4-phenylimidazole, 2-phenyl-4-methylimidazole, 2-undecylimidazoline, 2,4,5-trifuryl-2-imidazoline, 12-diphenyl-4,4-dimethyl-2-imidazoline, 2-phenyl-2-imidazoline, 1,2,3-triphenylguanidine, 1,2-ditolylguanidine, 1,2-dicyclohexylguanidine, 1,2,3-tricyclohexylguanidine, guanidine trichloroacetate, N,N'-dibenzylpiperadine, 4,4'-dithiomorpholine, morpholinium trichloroacetate, 2-aminobenzothiazole and 2-benzoylhydrazinobenzothiazole. It is possible to use two or more basic substances together.

The materials which are employed for a color producing reaction may be employed in the form of a dispersion, or in a partly encapsulated form, if required. The latter form is, however, preferable from the standpoint of raw storage stability so that the color producing substance and the coupler may not contact each other at an ordinary room temperature to cause fogging, and also from the standpoint of sensitivity control so that the reaction may take place only when an appropriate amount of heat energy is applied.

A microcapsule prevents the substances on both sides of its wall from contacting each other at an ordinary room temperature, but permits their permeation through its wall at an elevated temperature. The temperature at which their permeation starts can be controlled as desired if the materials of the capsule wall and core and the additives employed are appropriately selected. This temperature corresponds to the glass transition temperature of the capsule wall (see Japanese Laid-Open Patent Application No. 91438/1984, Japanese Laid-Open Patent Application No. 242094/1985 etc.). The wall of a capsule has a different glass transition point if it is formed from a different material. It is particularly preferable to use a capsule formed from polyurea polyurethane, a mixture of polyurea and urethane, a mixture of urea and formalin, a mixture of polyurea or polyurethane with another commercially available synthetic resin used as core material, polyester, or polyamide. Specific examples of techniques for making microcapsules and the compounds which can be employed therefor are described in U.S. Pat. Nos. 3,726,804 and 3,796,696. A microcapsule can enclose a diazo compound, coupling component, color producing component other than the diazo compound, coupler, or basic substance, or any combination thereof. Two or more kinds of diazo compounds, coupling components, basic substances, or color producing components other than the diazo compounds can be enclosed in a single capsule, or different capsules. Each capsule may contain a solution of the component or components in an organic solvent, or a dispersion of fine particles.

A microcapsule can be prepared by employing an emulsion containing at least 0.2% by weight of the component to be encapsulated. It is preferable to employ 0.1 to 10 parts by weight of coupling component and 0.1 to 20 parts by weight of basic substance for one part by weight of diazo compound. It is also preferable to use 0.3 to 160, or more preferably 0.3 to 80, parts by weight of coupler for one part by weight of color producing component other than the diazo compound.

It is also possible to add a color producing assistant. It is a substance which raises the density of a color produced by printing under heat, or which lowers the minimum temperature that enables a color to be produced. It is used for lowering the melting point of a coupling component, alkali, color producing substance, coupler, or diazo compound, or the softening point of the capsule wall to thereby facilitate their reaction. For this purpose, it is possible to use, for example, a phenol, alcoholic, aminde or sulfonamide compound. More specific examples are p-t-octylphenol, p-benzyloxyphenol, phenyl p-hydroxybenzoate, carbanilic acid benzyl ester, carbanilic acid phenetyl ester, hydroquinone dihydroxyethyl ether, xylilene diol, N-hydroxyethyl methanesulfonamide and N-phenyl methanesulfonamide. These compounds may be added to the core substance, or may alternately be dispersed in an area surrounding the microcapsule.

The heat-sensitive recording medium may contain a fine powder of silica, barium sulfate, titanium oxide, aluminum hydroxide, zinc oxide, calcium carbonate or other pigment, styrene beads, a urea-melamine resin, etc., in order to eliminate sticking to a thermal head or to improve the ease of writing. Metal soap can also be used to prevent the sticking of the medium to a thermal head. These substances may be used in a quantity of 0.2 to 7 $g/m^2$.

These substances can be bonded to the recording medium by an appropriate binder. The binder may be an emulsion of polyvinyl alcohol, methyl cellulose, carboxymethyl cellulose, hydroxypropyl cellulose, gum acacia, gelatin, polyvinyl pyrrolidone, casein, styrene-butadiene latex, acrylonitrile-butadiene latex, polyvinyl acetate, polyacrylate, or an ethylene-vinyl acetate copolymer. The emulsion may have a solid content of 0.5 to 5 $g/m^2$. It is also possible to add citric tartaric oxalic, boric phosphoric or pyrophosphoric acid as an acid stabilizer.

If no microcapsule is employed for the diazo compound, coupling component, basic substance, color producing component other than the diazo compound, or coupler, it is appropriate to prepare a dispersion of solid particles by means of a sand mill, etc. These materials are separately dispersed in a solution of a water-soluble high polymer. The solution is preferably of any of the water-soluble high polymers which are employed for making the microcapsules. It may have a polymer content of 2 to 30% by weight. The amounts of the diazo compound, etc. in the solution may each range from 5 to 40% by weight. The particles preferably have a size not exceeding 10 microns.

The image recorded on the medium in accordance with this invention appears as a transmitted or reflected image when viewed from one side of its transparent support. If it is a reflected image, it loses clarity if the rear side of the support is seen through the ground surrounding the image. Therefore, it is possible to add a white pigment to the light-sensitive layer, so that an image may be formed on a white background. It is alternatively possible to provide a separate layer containing a white pigment. In either event, it is effective for the white pigment to exist in the outermost layer on the opposite side of the support from the side from which a recorded image is viewed. Examples of the preferred white pigments are talc, calcium carbonate, calcium sulfate magnesium carbonate, magnesium hydroxide, alumina, synthetic silica, titanium oxide, barium sulfate, kaolin, calcium silicate and a urea resin. The heat-sensitive layer preferably has a weight of 3 to 20 $g/m^2$, or more preferably of 5 to 15 $g/m^2$. A weight which is less than 3 $g/m^2$ does not enable the layer to show satisfactory sensitivity. A weight exceeding 20 $g/m^2$ does not produce any improved result, but is merely uneconomical.

Description will now be made of the transparent support in further detail. It may, for example, comprise a film of polyester such as polyethylene or polybutylene terephthalate, a film of cellulose derivative such as cellulose triacetate, or a film of polyolefin such as polystyrene, polypropylene or polyethylene. It may consist of a single film or a plurality of films bonded together The support has a thickness of 20 to 200 microns, or preferably of 50 to 100 microns. An undercoating layer can be provided between the support and the heat-sensitive layer for improving the adhesion of the latter to the former. The undercoating layer is formed from gelatin, synthetic high polymer latex, nitrocellulose, etc. It preferably has a weight of 0.1 to 2.0 $g/m^2$, or more preferably of 0.2 to 1.0 $g/m^2$. No layer having a weight which is less than 0.1 $g/m^2$ is satisfactory for the effective adhesion of the heat-sensitive layer to the support. A layer having a weight exceeding the 2.0 $g/m^2$ does not produce any correspondingly better result, and is uneconomical. If the undercoating layer is swollen with the water which the heat-sensitive layer contains, the heat-sensitive layer is likely to have a surface of low quality. Therefore, the undercoating layer is preferably hardened with a curing agent.

It is possible to use as the curing agent an activated vinyl compound such as divinyl sulfone N,N'-ethylenebis(vinylsulfonylacetamide), 1,3-bis(vinylsulfonyl)-2-propanol, methylenebismaleimide, 5-acetyl-1,3-diacryloyl-hexahydro-s-triazine, 1,3,5-triacryloyl-hexahydro-s-triazine or 1,3,5-trivinylsulfonyl-hexahydro-s-triazine. It is also possible to use an activated halogen compound such as sodium 2,4-dichloro-6-hydroxy-s-triazine, 2,4-dichloro-6-methoxy-s-triazine , sodium 2,4-dichloro-6-(4-sulfoanilino)-s-triazine, .2,4-dichloro-6-(2-sulfoethylamino)-s-triazine or N,N'-bis(2-chloroethylcarbamyl)piperzine. It is also possible to use an epoxy compound such as bis(2,3-epoxypropyl)methylpropylammonium p-toluenesulfonate, 1,4-bis(2',3'-epoxypropyloxy)butane, 1,3,5-triglycidyl isocyanurate or 1,3-diglycidyl-5-(γ-acetoxy-β-oxypropyl) isocyanurate. Further examples of the curing agents are ethyleneimino compounds such as 2,4,6-triethylene-s-triazine, 1,6-hexamethylene-N,N'-bisethyleneurea and bis-β-ethyleneimino ethyl thioether, methanesulfonate compounds such as 1,2-di(methanesulfonoxy)ethane, 1,4-di(methanesulfonoxy)butane and 1,5-di(methanesulfonoxy)pentane, carbodiimide compounds such as dicyclohexyl carbodiimide, 1-cyclohexyl-3-(3-trimethylaminopropyl) carbodiimide-p-toluenesulfonate and 1-ethyl-3-(3-dimethylaminopropyl)carbodiimide hydrochloride, isooxazole compounds such as 2,5-dimethylisooxazole perchlorate, 2-ethyl-5-phenylisooxazole-3'-sulfonate and 5,5'-(paraphenylene)bisisooxazole, inorganic compounds such as chromium alum and chromium acetate, peptides formed by condensation with dehydration, such as N-carboethyoxy-2-isopropoxy-1,2-dihydroquinoline and N-(1-morpholinocarboxy)-4-methylpyridinium chloride, activated ester compounds such as N,N'-adipoyldioxydisuccinimide and N,N'-terephthaloyldioxydisuccinimide and isocyanates such as toluene-2,4-diisocyanate and 1,6-hexamethylenediisocyanate.

The amount of the curing agent may range from 0.20 to 3.0% by weight of the undercoating layer, depending on the method by which it is applied, and the desired degree of cure. If it is less than 0.20% by weight, the undercoating layer is not satisfactorily cured irrespective of the length of curing time employed, but swells when coated with the heat-sensitive layer. If it exceeds 3.0% by weight, however, the undercoating layer becomes so hard that it may fail to adhere closely to the support and may form a film separating therefrom.

When the pH of the solution which is employed to form the undercoating layer is controlled if required by the curing agent which is employed. Caustic soda can, for example, be added to prepare an alkaline solution, and citric acid to form an acidic solution. It is possible, if required, to add a defoaming agent to remove the bubbles which may form when the solution is applied, or an activator which enables the solution to be spread effectively without forming any streak. It is also possible to add an antistatic agent, if required. The surface of the support is preferably activated by a known method before the undercoating layer is formed thereon. Acid etching, flame treatment using a gas burner, or corona or glow discharge treatment can, for example, be employed for activating the support surface. However the corona discharge treatment as described in, for example, U.S. Pat. Nos. 2,715,075, 2,846,727, 3,549,406 and 3,590,107, is the most preferable method from the standpoints of cost and simplicity.

An overcoating layer is provided on the heat-sensitive layer for the primary purpose of rendering it resistant to water and damage. The overcoating layer is formed by employing, for example, polyvinyl alcohol, silicon-modified polyvinyl alcohol, gelatin, a styrene-maleic anhydride copolymer or starch, or a mixture thereof, as a binder. The binder is preferably cured by employing a curing agent of the same kind as what has been used for curing the undercoating layer, or may be borax, boric acid, colloidal silica, etc. It is effective to add a white pigment or body, such as kaolin, calcium carbonate, titanium dioxide, barium sulfate, zinc oxide, magnesium oxide or clay, to the overcoating layer in order to obtain a white background of higher clarity or prevent it from sticking to a thermal head during a printing operation. The addition of a small amount of a fluorescent, or color dye is also effective for achieving the higher clarity of a white background. The layer can alternatively contain an appropriate dye which gives a background of any desired color other than white. The overcoating layer preferably has a weight of 0.3 to 5 $g/m^2$ or more preferably of 0.5 to 4 $g/m^2$. If it is less than 0.3 $g/m^2$, the layer may fail to provide any satisfactory water and damage resistance. If it exceeds 4 $g/m^2$, it may be necessary to apply an unduly large amount of heat energy for printing an image. The layer can be formed by employing a well-known method, for example, dip coating, air-knife coating, curtain coating, roller coating, doctor coating, wire bar coating, slide coating, or gravure coating method, or an extrusion coating method using a hopper as described in U.S. Pat. No. 2,681,294. It is also possible to apply two or more layers simultaneously by employing a method as described in, for example, U.S. Pat. Nos. 2,761,791, 3,508,947, 2,941,898 or 3,526,528, or Yuji Harasaki's "Coating Engineering", page 253 (published by Asakura Shoten in 1973). An appropriate method can be selected if the desired coating weight and speed, etc. are taken into account. The coating solution may further contain a pigment dispersant, thickening agent, fluidity modifier, defoaming agent foam inhibitor release agent, or coloring agent, if required, and if the addition thereof has no adverse effect on the properties of the layer.

Figures 5A, 5B, 5C, 6, 7, 8:
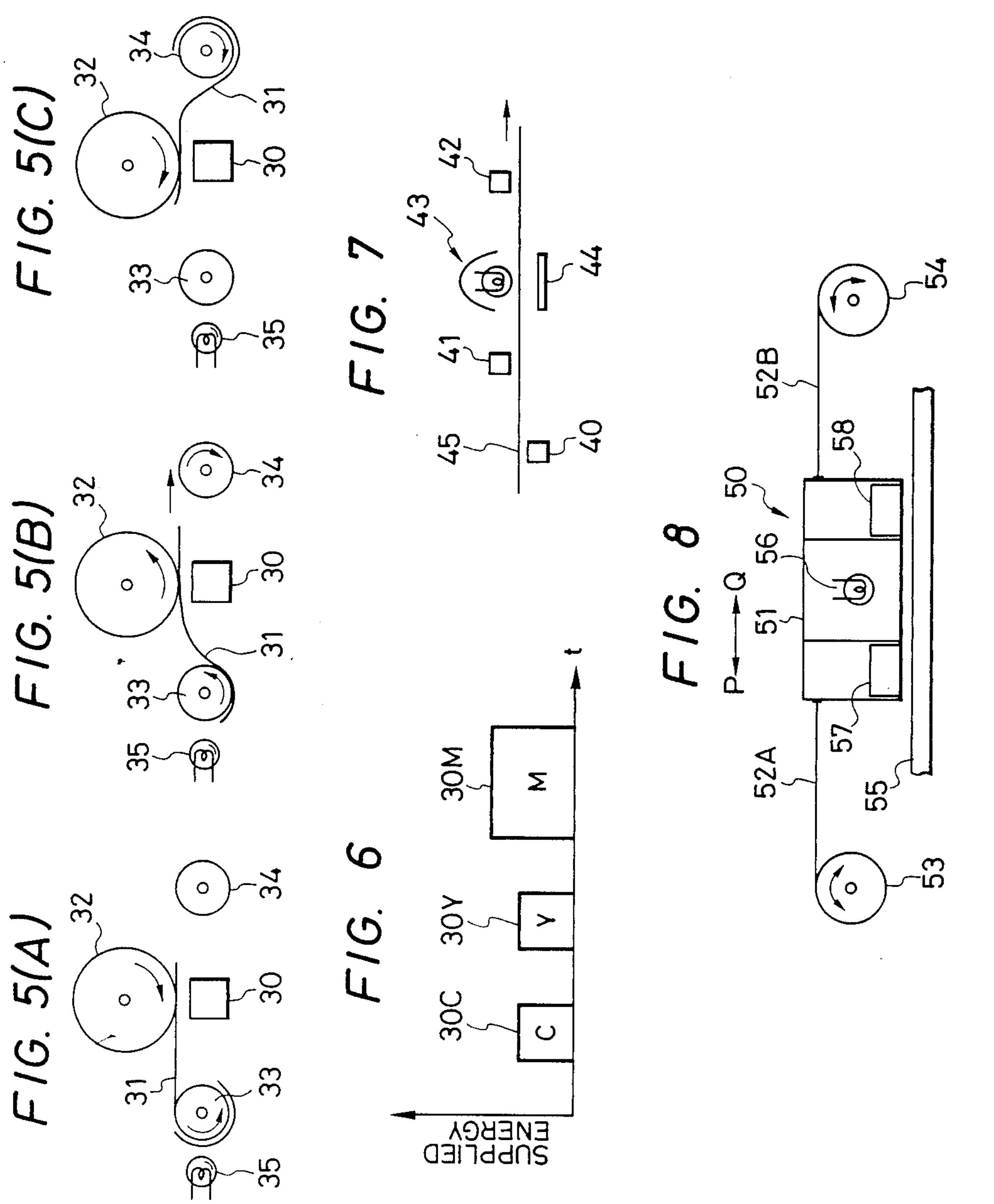
FIGS. 5(A) to 5(C) are schematic illustrations showing the operation of a device according to another embodiment of this invention.
FIG. 6 is a graphical representation of the heat energy employed by the device of FIGS. 5(A) to 5(C).
FIG. 7 is a schematic illustration of a device according to still another embodiment of this invention.
FIG. 8 is a view showing by way of example a serial type thermal head which can be employed for realizing this invention.

Attention is now directed to FIGS. 5(A) to 5(C) showing a device according to another embodiment of this invention. It has a single thermal head 30 for the thermal recording of an image on a heat-sensitive recording medium 31 of the type as shown in FIG. 2(A). The recording medium 31 is supplied from a roll 34 to a recording drum 32, as shown in FIG. 5(A). and a relatively small amount of heat energy is supplied by the thermal head 30, as shown in FIG. 6, to record an image in a C layer. Then it is conveyed to a roll 33 and the C layer is fixed by a light source 35. The medium 31 is reversed and conveyed again to the recording drum 32, and an image is recorded in a Y layer, as shown in FIG. 5(B). Then, it is returned to the drum 34 and reversed again, as shown in FIG. 5(C). It is conveyed again to the recording drum 32 and image is recorded in the inner M layer by the application of a relatively large amount of heat energy as shown at 30M in FIG. 6. Thus, it is possible to record a multicolored image of the kind which has herein before been described.

Another device is shown in FIG. 7. It has three thermal heads 40 to 42 disposed along a path which a heat-sensitive recording medium 45 is conveyed. The thermal head 40 is provided for recording an image in a Y layer, and the thermal head 41 for recording an image in an outer C layer. The C layer is fixed by a light source 43. The thermal head 42 is provided for supplying a relatively large amount of heat energy to record an image in an M layer. A mirror 44 is provided below the light source 43 for producing an improved effect of fixing.

FIG. 8 shows by way of example a serial head 50 which can be employed in the device of this invention. It comprises a head assembly 51 connected to wires 52A and 52B which are wound on rollers 53 and 54, respectively. The rollers 53 and 54 are rotatable for moving the head assembly 51 either along a P or a Q direction parallel to a heat-sensitive recording medium 55. The head assembly 51 contains a light source 56 for fixing an image and two thermal heads 57 and 58 which are selectively operable depending on the direction in which the head assembly 51 is moved. If it is moved in the Q direction, the thermal head 58 is operated for recording an image in a C layer and the C layer is fixed by the light source 56. If it is moved in the P direction, the thermal head 57 is operated for supplying a larger amount of heat energy to record an image in an M layer.

Although the devices have been described as recording images by means of the thermal head or heads on a heat-sensitive recording medium having at least one color producing layer on each side of a transparent support, the device of this invention as shown in, for example, FIGS. 1(A) and 1(B) is applicable to not only a thermal recording system, but also a thermal transfer system employing an ink sheet, an ink jet recording system, or an electrophotographic system. The recording medium may be of ordinary paper, or of any other material if both sides thereof are available for recording. Therefore, this invention covers any recording device of the nature which is so constructed and designed for operation as will hereinafter be described. A recording medium having a pair of surfaces which are both available for recording is conveyed to a first recording drum. A recording head which is located in front of the first recording drum is operated for recording an image on one side of the medium. Then, the medium is conveyed to a second recording drum and thereby reversed. The recording head is moved to the position in which it faces the second recording drum, and is operated for recording an image on the other side of the medium.

The multicolor thermal recording device of this invention can record a full-colored image on a heat-sensitive recording medium comprising a transparent support, while it is relatively simple in construction.

What is claimed is:

1. A multicolor thermal recording device, comprising:

means for conveying along a path a heat-sensitive recording medium having at least one coupler layer on both a first side and a second side of a transparent support;

recording means for supplying heat to one of said coupler layers on said first side according to a first color signal to produce a first color image in said medium and for supplying heat to another of said coupler layers on said second side according to a second color signal to produce a second color image in said medium; and means for fixing at least one of said first and second color images in said medium.

2. A recording device as recited in claim 1, wherein said recording means is disposed on one side of said path along which said medium is conveyed by said conveying means and faces said medium and wherein said conveying means reverses an orientation of said medium, whereby said recording means faces alternately said first side and said second side of said medium.

3. A recording device as recited in claim 1, wherein said recording means comprises a first recording means disposed on a first side of said path facing said first side of said conveyed medium for supplying heat to said coupler layer on said first side of said medium to produce said first color image and a second recording means disposed on a second side of said path facing said second side of said conveyed medium for supplying heat to said coupler layer on said second side of said medium to produce said second color image.

4. A recording device as recited in claim 1;

wherein said first side of said medium has two coupler layers:

wherein said recording means further supplies heat to another of said coupler layers on said first side of said medium according to a third color signal to produce a third color image in said medium; and wherein said fixing means fixes said first color image before said recording means supplied heat to produce said third color image.

* * * * *